US012776550B2

(12) United States Patent
Sugiyama et al.

(10) Patent No.: US 12,776,550 B2
(45) Date of Patent: Oct. 27, 2026

(54) SEPARATOR FOR VALVE-REGULATED LEAD ACID BATTERY USING GLASS FIBER AND HEAT-FUSIBLE ORGANIC FIBER

(71) Applicant: ENTEK Asia Inc, Fuwa-gun (JP)

(72) Inventors: Shoji Sugiyama, Fuwa-gun (JP); Keita Mori, Fuwa-gun (JP)

(73) Assignee: ENTEK ASIA INC, Fuwa-gun (JP)

( * ) Notice: Subject to any disclaimer, the term of this patent is extended or adjusted under 35 U.S.C. 154(b) by 669 days.

(21) Appl. No.: 17/801,504

(22) PCT Filed: Feb. 1, 2021

(86) PCT No.: PCT/JP2021/003551
§ 371 (c)(1),
(2) Date: Aug. 22, 2022

(87) PCT Pub. No.: WO2021/171918
PCT Pub. Date: Sep. 2, 2021

(65) Prior Publication Data

US 2023/0078669 A1 Mar. 16, 2023

(30) Foreign Application Priority Data

Feb. 26, 2020 (JP) ................................ 2020-030677

(51) Int. Cl.
*H01M 50/437* (2021.01)
*H01M 50/325* (2021.01)
*H01M 50/44* (2021.01)

(52) U.S. Cl.
CPC ....... *H01M 50/437* (2021.01); *H01M 50/325* (2021.01); *H01M 50/44* (2021.01)

(58) Field of Classification Search
CPC .. H01M 10/121; H01M 50/44; H01M 50/325; H01M 50/437; Y02E 60/10
USPC ........................................................... 429/54
See application file for complete search history.

(56) References Cited

U.S. PATENT DOCUMENTS 5,281,498 A * 1/1994 Muto .................. H01M 50/494 429/247
8,221,920 B2 * 7/2012 Kawachi ............. H01M 50/446 429/129
2014/0302367 A1 * 10/2014 Ueno ................ H01M 10/0431 429/94
2018/0083259 A1 * 3/2018 Ho ...................... H01M 50/414
2018/0175392 A1 * 6/2018 Wertz .................. H01M 50/446

FOREIGN PATENT DOCUMENTS

JP 2002008621 A * 1/2002
JP 2004127578 A * 4/2004
JP 2004296159 A * 10/2004
JP 2006054123 A * 2/2006
JP 2016-173901 A 9/2016

OTHER PUBLICATIONS

Parikh, Dilip M. "Vacuum Drying: Basics and Application." Chemical Engineering 122.4 (2015). p. 49; par. 1 and 4 (Year: 2015).*
JP 2004127578 A—WIPO Machine Translation, retrieved Mar. 2025 (Year: 2025).*
JP 2006054123 A—Espacenet Machine Translation, retrieved Mar. 2025 (Year: 2025).*
Zguris, G. C. "Density/solidity of recombinant battery separator material-its influence on both separator and battery performance in valve-regulated lead-acid systems." Journal of power sources 133.1 (2004): 67-78. p. 70; par. 1 and Fig. 5-6 (Year: 2004).*
JP 2002008621 A—Machine translation, retrieved on Dec. 2025 (Year: 2025).*
JP 2004296159 A—Machine translation, retrieved on Dec. 2025 (Year: 2025).*
Zguris, G. C. "Density/solidity of recombinant battery separator material-its influence on both separator and battery performance in valve-regulated lead-acid systems." Journal of power sources 133.1 (2004): 67-78. p. 70; par. 1-2 and Fig. 5-6 (Year: 2004).*
JP 2004296159 A—Machine translation, retrieved in Dec. 2025 (Year: 2025).*
Hatmanto, A. Perspective—Advanced Materials Science Research (2024) vol. 7, Issue 5. p. 218; par. 4 (Year: 2024).*
Extended European Search Report for corresponding EP Patent Application No. 21759802.8 dated Aug. 12, 2024 (9 sheets).
Office Action of Chinese Patent Application No. 20180016771.6 issued Jul. 31, 2026 (6 sheets).

* cited by examiner

*Primary Examiner* — Nicole M. Buie-Hatcher
*Assistant Examiner* — Gilberto Ramos Rivera
(74) *Attorney, Agent, or Firm* — Kratz, Quintos & Hanson, LLP

(57) ABSTRACT

To provide a separator (AGM separator) for valve-regulated lead acid batteries that does not undergo delamination due to bonding between the separators even under severe conditions (a pressure in winding, a high temperature and a high humidity in transportation and storage). A separator (AGM separator) for valve-regulated lead acid batteries, containing a microglass fiber and a heat-fusible organic fiber, the separator having a thickness under a pressure of 20 kPa of more than 0.50 mm and less than 1.80 mm and having a bonding strength between the separators after being left for 48 hours under a pressure of 5 to 10 kPa in an environment of a temperature of 70° C. and a humidity of 75% of less than 0.10 N.

10 Claims, No Drawings

SEPARATOR FOR VALVE-REGULATED LEAD ACID BATTERY USING GLASS FIBER AND HEAT-FUSIBLE ORGANIC FIBER

TECHNICAL FIELD

The present invention relates to improvement of separators to be used for valve-regulated lead acid batteries. More particularly, the present invention relates to resolution of a problem, involved in battery production, of an AGM (absorbent glass mat) separator containing a microglass fiber and a heat-fusible organic fiber.

BACKGROUND ART

A liquid-type lead acid battery has been used in a conventional battery for automobiles. However, in a lead acid battery for automobiles in recent years, with the spread of the idling stop and start system (hereinafter referred to as ISS), the use state of the battery has been such that the electric power is not used only for starting the engine as before, but also is supplied to an electrical system in stopping the engine besides in starting the engine, and thus charging-discharging cycles are performed more frequently than before.

At the same time, since the battery is not always in the state of full charge, agitation of the electrolyte does not occur, and a difference occurs in the specific gravity of the electrolyte in the battery (electrolyte stratification phenomenon: hereinafter referred to as stratification). This is a factor that reduces the battery life.

Accordingly, a valve-regulated lead acid battery having a better battery life performance than that of a liquid-type lead acid battery has become used in place of a conventional liquid-type lead acid battery, and has become popularized.

Lead acid batteries for automobiles have been subjected to severe cost competition, and it is essential to improve the tact time in battery production. Thus, an AGM separator having high strength is required. PTL 1 describes a nonwoven fabric containing 4 to 12% of a heat-fusible binder fiber and a glass fiber having an average fiber diameter of 3 μm or less in which bonding between fibers in a sheet is increased to inhibit variation in liquid permeability of the electrolyte.

The separator described in the document has a relatively large thickness and the thickness under a pressure of 20 kPa is 1.8 mm. Due to the large thickness, even when the amount of the heat-melting binder fiber as a reinforcing material blended is 12% or less, the separator itself has a large absolute strength and has such a strength that does not have influence on the workability of battery assembly.

On the other hand, in a valve-regulated lead acid battery used in ISS in recent years, great importance has been given to a high-rate discharge characteristic (high-rate characteristics) as one of performances required for batteries for automobiles. For the purpose of increasing the high-rate discharge characteristics, the pole plate gap of the battery is set narrow. Accordingly, the separator for valve-regulated lead acid batteries has a small thickness of less than 1.8 mm, and thus the absolute strength of the AGM separator decreases.

At the same time, for enhancing the battery assemblability, an AGM separator having a high tensile strength (sheet strength) is demanded.

However, increasing the amount of an organic fiber blended which has a smaller specific surface area than fine glass fibers and has a low hydrophilicity leads to a tendency to inhibit the electric resistance and liquid retention which are basic properties of the AGM separator.

Thus, a possible measure for increasing the tensile strength (sheet strength) while as little as possible increasing the amount of the organic fiber blended is to decrease the fineness of the heat-fusible organic fiber (making the fiber finer) to increase the number of the fibers. However, when the fineness of the heat-fusible organic fiber is decreased, in producing an AGM separator by papermaking, a problem occurs in that the organic fiber and the glass fiber are not uniformly mixed under an influence of a difference in the specific gravity between the organic fiber and the glass fiber, leading to a large variation in the properties of the AGM separator so that an AGM separator having a stable quality cannot be obtained.

In PTL 2, a heat-fusible organic fiber is used as a high-strength AGM separator, and improvement in cuttability of the separator is described therein.

PTL 2 states that, by incorporating an all-dissolution type CoPET (polyethylene terephthalate copolymer) which is an all-melting type heat-melting binder fiber having a fiber diameter larger than 14 μm, the tensile strength can be increased and the variation in the air permeability can be decreased. It is also stated that, as compared with an AGM separator containing a core/sheath type heat-melting binder fiber, one containing an all-melting type heat-melting binder fiber is superior in the slitting cutting property.

PTL 3 states that 10 to 25% of a heat-fusible core/sheath fiber and 0 to 5% of a monofilament heat-fusible fiber are blended as a sealable separator and the total amount of the organic materials therein is 20 to 30%. In a separator described therein, bonding mainly by gear sealing is easy and breakage in a bonding part does not occur.

However, since the amount of a heat-fusible organic fiber blended is large due to the purpose of increasing the bonding strength of the separator, the liquid absorption of the electrolyte is about 16 to 28% deteriorated than conventional examples.

In general, an AGM separator used in a valve-regulated lead acid battery is delivered in a state wound into a roll, and also when unwound and used, the top layer delamination may occur due to bonding of the front surface and the back surface, leading to a problem.

The phenomenon that bonding of the front and back surfaces occurs in unwinding an AGM separator is considered to be influenced by the winding pressure of the AGM separator and the temperature/humidity environment (conditions) from the product transport to storage and the actual use of a battery.

In general, a pressure of 5 kPa or more is applied in winding the roll for preventing disintegration of the wound state.

In transportation, the AGM separator may be subjected to extended transport in a container, and depending on the destination, may cross the equator, and thus be subjected to conditions of high temperature and high humidity. The temperature in a container around the equator is said to be increased to 70° C.

In addition, in the storage in battery manufacturers, the temperature/humidity environment (conditions) obviously largely differs depending on the region and company.

CITATION LIST

Patent Literature

PTL 1: Japanese Patent No. 6518094
PTL 2: JP-A-2018-37335
PTL 3: JP-A-2009-245901

SUMMARY OF INVENTION

Technical Problem

The present invention is made in view of the above situation, and an object of the present invention is to provide a separator (AGM separator) for valve-regulated lead acid batteries that does not undergo delamination due to bonding between the separators even under such severe conditions as described above (a pressure in winding, a high temperature and a high humidity in transportation and storage).

Solution to Problem

As a result of extensive and intensive studies for solving the above problem, the separator (AGM separator) for valve-regulated lead acid batteries of the present invention is a separator for valve-regulated lead acid batteries having the following features.

(1) A separator for valve-regulated lead acid batteries, containing a microglass fiber and a heat-fusible organic fiber, the separator having a thickness under a pressure of 20 kPa of more than 0.50 mm and less than 1.80 mm, and having a bonding strength between the separators after being left for 48 hours under a pressure of 5 to 10 kPa in an environment of a temperature of 70° C. and a humidity of 75'% of less than 0.10 N.

(2) The separator for valve-regulated lead acid batteries according to the above (1), wherein the bonding strength between the separators after being left for 48 hours under a pressure of 5 kPa in an environment of a temperature of 70° C. and a humidity of 75% is less than 0.10 N.

(3) The separator for valve-regulated lead acid batteries according to the above (1), wherein the bonding strength between the separators after being left for 48 hours under a pressure of 10 kPa in an environment of a temperature of 70° C. and a humidity of 75% is less than 0.10 N.

(4) The separator for valve-regulated lead acid batteries according to any one of the above (1) to (3), wherein the separator has a tensile strength of 5.0 N/10 $mm^2$ or more.

(5) The separator for valve-regulated lead acid batteries according to any one of the above (1) to (4), wherein the heat-fusible organic fiber is an organic fiber having a core/sheath structure with a sheath of a crystalline heat-fusible polyolefin resin or a crystalline heat-fusible polyester resin.

(6) The separator for valve-regulated lead acid batteries according to any one of the above (1) to (5), wherein the heat-fusible organic fiber has a fineness of 0.9 dtex or more and 1.6 dtex or less.

(7) The separator for valve-regulated lead acid batteries according to any one of the above (1) to (6), which is a wound body wound with a pressure of 5 kPa or more applied.

(8) The separator for valve-regulated lead acid batteries according to any one of the above (1) to (7), wherein the heat-fusible organic fiber is contained in an amount of more than 12% by weight.

(9) The separator for valve-regulated lead acid batteries according to any one of the above (1) to (8), wherein the microglass fiber has a number average fiber diameter of 2 μm or less.

(10) The separator for valve-regulated lead acid batteries according to any one of the above (1) to (9), wherein the microglass fiber and the heat-fusible organic fiber are contained in a total amount of 60% by weight or more.

(11) A valve-regulated lead acid battery including the separator for valve-regulated lead acid batteries according to any one of the above (1) to (10).

Advantageous Effects of Invention

It is possible to provide a separator (AGM separator) for valve-regulated lead acid batteries that does not undergo delamination due to bonding between the separators even under such severe conditions as described above (a pressure in winding, a high temperature and a high humidity in transportation and storage).

DESCRIPTION OF EMBODIMENTS

The separator (AGM separator) for valve-regulated lead acid batteries of the present invention is obtained by wet-papermaking mainly from a microglass fiber and a heat-fusible organic fiber, and in addition to the microglass fiber and the heat-fusible organic fiber, an inorganic powder, such as silica, or a non-heat-fusible organic fiber or resin, such as a cellulose, a carbon fiber, or a polyacrylonitrile fiber, which is excellent in acid resistance and oxidation resistance, may be contained.

By incorporating a non-heat-fusible monofilament polyester terephthalate fiber as a third component besides the heat-fusible organic fiber, a superior AGM separator is obtained which does not undergo delamination due to bonding of the front and back surfaces of the AGM separator even in a wound state with a pressure and which does not undergo compression breaking (shearing) in a sealed part even in processing into a pouch by gear sealing, heat sealing, ultrasonic sealing, or the like.

By incorporating a non-heat-fusible monofilament organic fiber, the compression breaking strength (shearing force) of a nonwoven fabric can be increased (see, for example, Japanese Patent No. 4261821), making it possible to obtain a further superior AGM separator.

Besides, a combined effect by a combination with various non-heat-fusible materials can be expected.

As the microglass fiber for use in the separator (AGM separator) for valve-regulated lead acid batteries of the present invention, a C glass fiber having acid resistance is preferred since the separator is used in an electrolyte (a sulfuric acid solution having a specific gravity of 1.3), but the microglass fiber is not limited to the C glass fiber as long as it is an acid-resistant microglass fiber.

The fiber diameter of the microglass fiber is different depending on the combined heat-fusible organic fiber or other auxiliary materials, but one of functions to be expected for the AGM separator is inhibition of stratification, and from this point of view, the number average fiber diameter is preferably 4.5 μm or less. When the stratification inhibition is to be more improved, for example, because of use in a battery for ISS, the number average fiber diameter is further preferably 2 μm or less.

Examples of synthetic resin component of the heat-fusible organic fiber used for the separator (AGM separator) for valve-regulated lead acid batteries of the present invention include synthetic resins, for example, polyolefin resins, such as polyethylene resin and polypropylene resin, a polystyrene resin, a polymethyl methacrylate resin, a polyacrylonitrile resin, a nylon resin, a polyester resin, and a polytetrafluoroethylene resin. Heat-melting components among the above resins are polyolefin resins, such as a polyethylene resin and a polypropylene resin, and a heat-fusible polyester resin.

In the present invention, from the viewpoint of an improving effect on the tensile strength (sheet strength), a heat-fusible resin having a highly crystalline structure, for example, a polyolefin resin, such as a polyethylene resin or a polypropylene resin, or a low-melting-point crystalline polyester resin is preferably used, and a polyethylene resin is particularly preferred.

In the case of a non-crystalline heat-fusible resin, such as a modified polyethylene resin or a modified polyester resin, specifically, a polyethylene copolymer (CoPE) or a copolymerized polyethylene terephthalate (CoPET), the adhesiveness is too high, and thus, under a pressure in winding or under conditions of a high temperature and a high humidity in transportation and storage, bonding between the front and back surfaces of the superposed AGM separators occurs, unfortunately causing top layer delamination of the front and back surfaces of the AGM separator in unwinding the AGM separator and other problems.

For increasing the number of heat-fusible organic fibers contained in the AGM separator, which is a measure for increasing the tensile strength (sheet strength), the heat-fusible organic fiber is preferably a heat-fusible organic fiber having a fineness of less than 1.7 dtex, more preferably a heat-fusible organic fiber having a fineness of 1.6 dtex or less, and further preferably a heat-fusible organic fiber having a fineness of 1.5 dtex or less.

On the other hand, although the adhesiveness of the heat-fusible organic fiber is largely increased by reducing the fineness of the heat-fusible organic fiber blended (making the fiber finer), as a result, the front and back surfaces of the AGM separator are in a bonded state since a pressure of 5 kPa or more is applied in winding the AGM separator, and the possibility of the problem of bonding of the front and back surfaces of the AGM separator under certain conditions is increased.

In addition, when the fineness of the heat-fusible organic fiber is 0.8 dtex or less, in papermaking of the AGM separator, a problem occurs in that the heat-fusible organic fiber and the microglass fiber are not uniformly mixed under an influence of a difference in the specific gravity between the heat-fusible organic fiber and the microglass fiber, leading to a large variation in the properties of the AGM separator so that an AGM separator having a stable quality cannot be obtained. Thus, the fineness of the heat-fusible organic fiber is preferably more than 0.8 dtex, and more preferably 1.0 dtex or more.

The heat-fusible organic fiber used for the separator (AGM separator) for valve-regulated lead acid batteries of the present invention is preferably one having a core/sheath structure. In this case, the core may be a generally used resin, such as a polyethylene resin, a polypropylene resin, or a polyester resin, but is preferably an acid resistant one having a melting point of 160° C. or more.

The sheath is preferably a highly crystalline, heat-fusible resin, for example, a polyolefin resin, such as a polyethylene resin or a polypropylene resin, or a low-melting-point crystalline polyester resin. On the other hand, in the case of a polyolefin resin or a modified polyester resin which is a non-crystalline heat-fusible resin, specifically, a polyethylene copolymer (CoPE) or a copolymerized polyethylene terephthalate (CoPET), the adhesiveness is too high, and thus bonding between the front and back surfaces of the superposed AGM separators occurs under a pressure in winding or under conditions of a high temperature and a high humidity in transportation or storage, unfortunately causing top layer delamination of the front and back surfaces of the AGM separator in unwinding the AGM separator and other problems.

In the separator (AGM separator) for valve-regulated lead acid batteries of the present invention, the amount of the heat-fusible organic fiber blended is preferably more than 12% by weight for maintaining the absolute strength of the AGM separator, more preferably 15% by weight or more, and further preferably 20% by weight or more.

With an amount thereof less than 12% by weight, the tensile strength (sheet strength) of the AGM separator is short.

The amount of the heat-fusible organic fiber blended is preferably 40% by weight or less, more preferably 35% by weight or less, and further preferably 30% by weight or less.

With an amount thereof more than 40%, the ability to hold the electrolyte decreases, and sulfuric acid released from a pole plate in charging cannot be held, causing stratification of the electrolyte.

In the separator (AGM separator) for valve-regulated lead acid batteries of the present invention, the total amount of the microglass fiber and the heat-fusible organic fiber blended is preferably 601 by weight or more, more preferably 65% by weight or more, and further preferably 70% by weight or more.

In the separator (AGM separator) for valve-regulated lead acid batteries of the present invention, the thickness of the AGM separator is preferably more than 0.50 mm, and more preferably 0.60 mm or more.

When the thickness of the AGM separator is 0.50 mm or less, the total amount of the electrolyte that the AGM separator can hold decreases, and thus a function to inhibit stratification of the electrolyte deteriorates. This is because the absolute strength of the AGM separator deteriorates.

On the other hand, the thickness of the AGM separator is preferably less than 1.80 mm, more preferably 1.70 mm or less, and particularly preferably 1.65 mm or less.

When the thickness of the AGM separator is 1.80 mm or more, the distance between the pole plates of the battery is increased to worsen the battery characteristics.

In the separator (AGM separator) for valve-regulated lead acid batteries of the present invention, for enhancing the assemblability of a battery, the tensile strength (sheet strength) of the AGM separator is preferably 5.0 N/10 $mm^2$ or more, and more preferably 7.5 N/10 $mm^2$ or more.

When the tensile strength (sheet strength) is less than 5.0 N/10 $mm^2$, the battery assembly performance and the basic properties in charging/discharging reaction deteriorate, and the battery life decreases.

In the separator (AGM separator) for valve-regulated lead acid batteries of the present invention, from the viewpoint of preventing stratification of the electrolyte, the maximum pore size of the AGM separator is preferably less than 100 μm, and more preferably 40 μm or less.

In the separator (AGM separator) for valve-regulated lead acid batteries of the present invention, the coefficient of extension of the AGM separator is preferably in the range of 2.0% or more and less than 9.0%, and more preferably in the range of 2.5% or more and 7.5% or less.

In the charging/discharging reaction in use of the battery, absorption and release of the electrolyte are repeated, resulting in expansion and contraction of the AGM separator.

In addition, the AGM separator is delivered in a roll shape mainly in delivery, and is pulled out from the roll and used in assembling a battery. Thus, when the coefficient of extension of the AGM separator as measured under a room temperature condition is 9.0% or more, the AGM separator is extended by a force in pulling out the AGM separator and the dimensions in the width direction and the thickness direction of the AGM separator vary.

In this case, the distance between pole plates and the size thereof set for preventing the short-circuiting on the side surface of the battery electrodes vary, causing an early battery short-circuiting.

When the AGM separator is pulled out from the roll and is used in assembling a battery, with a coefficient of extension less than 2.0%, cracking occurs in the AGM separator, resulting in a defective product which cannot be delivered.

In the separator (AGM separator) for valve-regulated lead acid batteries of the present inventio, for inhibiting bonding between AGM separators, as the heat-fusible organic fiber to be used, only a fiber having a core/sheath structure is preferably used. In this case, the core is preferably an acid resistant resin having a melting point of higher than 160° C., more preferably such a resin having a melting point of 180° C. or higher, and further preferably such a resin having a melting point of 200° C. or higher.

In a heating and drying step in producing the AGM separator, the drying and heating is preferably performed at a temperature higher than 160° C. which is a typical temperature for drying and heating, the drying and heating is more preferably performed at 170° C. or higher, and the drying and heating is further preferably performed at 180° C. or higher.

Regarding the time for heating and drying, the heating and drying is desirably performed for a time longer than a typical time (several minutes or so), the heating and drying is preferably performed for 10 minutes or longer, the heating and drying is more preferably performed for 20 minutes or longer, and the heating and drying is further preferably performed for 30 minutes or longer.

For enhancing the adhesiveness between the fibers constituting the AGM separator, the drying is further preferably performed with the surface of the AGM separator pressurized.

It is considered that, when the AGM separator is produced by using only a heat-fusible organic fiber having specific properties and performing heating and drying at a higher temperature and for a longer time than a typical case as described above, top layer delamination in unwinding due to bonding between the AGM separators can be inhibited even under severe conditions (a pressure in winding, a high temperature and a high humidity in transportation and storage).

EXAMPLES

The present invention will be described more specifically below with reference to Examples, Reference Examples, and Comparative Examples, but the present invention is not to be limited to the following Examples without departing from the gist thereof.

Separators (AGM separators) for valve-regulated lead acid batteries of Examples 1 to 7, Reference Examples 1 to 2, and Comparative Examples 1 to 9 were produced using the following materials.

[Compounding Materials]

(1) Microglass Fiber

CMLF-208, manufactured by Nippon Sheet Glass Co., Ltd., number average fiber diameter: 0.8 μm (2) Non-Adhesive Monofilament Organic Fiber EP133-5™, manufactured by Kuraray Co., Ltd., polyethylene terephthalate, fineness: 1.45 dtex (3) Heat-Fusible Organic Fiber A: Melty 6080™, manufactured by UNITIKA LTD., two-component core/sheath type (core: polyethylene terephthalate, sheath: polyethylene), fineness: 1.50 dtex B: PZ08-5, manufactured by Daiwabo Holdings Co., Ltd., one-component all-melting type (polypropylene), fineness: 0.80 dtex C: Casven 8080™, manufactured by UNITIKA LTD., two-component core/sheath type (core: polyethylene terephthalate, sheath: polyethylene terephthalate), fineness: 1.10 dtex D: Melty 4000™, manufactured by UNITIKA LTD., one-component all-melting type (copolymerized polyethylene terephthalate), fineness: 2.20 dtex E: Melty 4080™, manufactured by UNITIKA LTD., two-component core/sheath type (core: polyethylene terephthalate, sheath: copolymerized polyethylene terephthalate), fineness: 1.22 dtex

[Production of AGM Separator]

The separators (AGM separators) for valve-regulated lead acid batteries of Examples 1 to 7, Reference Examples 1 to 2, and Comparative Examples 1 to 9 were produced by the following procedure according to the formulation shown in Tables 1 to 2.

About 7 to 10 g of materials were put in a container of an industrial mixer (MX-152SP, manufactured by Panasonic Corporation), about 1000 ml of an aqueous sulfuric acid solution of pH 3 was added thereto, and the mixture was subjected to disaggregation (rotation speed: about 9700 rpm) for 60 seconds. The sample in a slurry form was put in a square sheet machine for experiments. An aqueous sulfuric acid solution of pH 3 was further added thereto and the mixture was uniformly stirred so as to obtain a concentration of 0.25% by weight, followed by forming a sheet. The sheet was dried with heat using a compartment dryer at a temperature of 180° C. for 30 minutes to produce an AGM separator. In drying the sheet, attention was paid so that water vapor did not remain in the dryer.

[Methods for Test and Evaluation]

For the Examples, Reference Examples, and Comparative Examples, evaluation was made under the following conditions. The results are collectively shown in Tables 1 to 2.

(1) Weight (g/m$^2$)

The produced AGM separator was cut into a size of 100 mm×100 mm to make a test piece. The weight of ten such test pieces was measured with an electronic balance and the weight (g/m$^2$) was calculated.

(2) Thickness (mm)

The produced AGM separator was cut into a size of 100 mm×100 mm to make a test piece. Ten such test pieces were stacked, and measurement was performed according to the method described in the Storage Battery Association Standard SBA S0406-2017 7.2.2.b) for AGM separator for valve-regulated lead acid battery.

In the measurement, a load of 196 N was calmly applied so that the load was evenly exerted over the entire surface of the stacked ten test pieces, and the thicknesses of the four corners of the AGM separator were measured and the average thereof was taken as the thickness.

(3) Apparent Density (g/Cm$^3$)

Measurement was performed according to the method described in the Storage Battery Association Standard, SBA S0406-2017 7.2.3 for AGM separator for valve-regulated lead acid battery, and the apparent density was calculated by the following equation.

$$\text{Apparent density(g/cm}^3\text{)}=[\text{weight(g/m}^2\text{)}]/[\text{thickness (mm)}]/1000$$

(4) Tensile Strength (N/10 $mm^2$)

Measurement was performed by the following procedure based on the method described in the Storage Battery Association Standard, SBA S0406-2017 7.2.7 for AGM separator for valve-regulated lead acid battery.

The produced AGM separator was cut into a size of 10 mm×70 mm to make a test piece. Measurement was performed with a shopper type or an equivalent tensile tester of 294 N or less. The test piece was pulled at a rate of 200 mm/minute with a distance between chucks (grips) of 50 mm to measure the maximum value until the test piece broke.

(5) Maximum Pore Size (μm)

The test piece was impregnated with ethanol, and ethanol was further poured to the test piece from a height of 10 mm, and pressurized air was allowed to flow from the below (AGM separator surface). The pressure of the air was gradually increased, and the pressure value at the time when a bubble (air bubble) first appeared through the test piece was read on a manometer (mm). The maximum pore size was calculated by the following calculation equation.

At this time, the temperature of the ethanol was measured, and the surface tension at the temperature was assigned in the calculation formula.

$$\text{Maximum pore size } (\mu m)=[4\times(\text{surface tension of liquid})\times 10^4]/[980\times\{(\text{read value on manometer, mm})-(\text{height of liquid above sample, 10 mm})\}]$$

(6) Bonding Strength (N)

a. As testing conditions, two pattens: "left for 48 hours under conditions of a temperature of 70° C., a humidity of 75%, and a pressure of 5 kPa" and "left for 48 hours under conditions of a temperature of 70° C., a humidity of 75%, and a pressure of 10 kPa" were employed.
b. The produced AGM separator was cut (5 kPa pressure: 100 mm×100 mm, 10 kPa pressure: 70 mm×70 mm) to make a sample (each set included two samples).
c. As a pretreatment, the samples (two samples for each set) were left for one hour in a thermostatic and humidifying chamber set to the same temperature and humidity conditions as the testing conditions.
d. The pretreated samples (two samples for each set) were interposed between two sheets of fine paper (cut into the same size as the samples), which were interposed between two acrylic boards (120 mm×120 mm×10 mm thickness), which were then placed in a thermostatic and humidifying chamber set to the same temperature and humidity conditions as the testing conditions. A prescribed weight (5 kPa pressure: 5 Kg, 10 kPa pressure: 10 Kg) was placed on the acrylic board.
e. After leaving for 48 hours, the samples were taken out of the thermostatic and humidifying chamber, and the bonding strength was measured.
f. The bonding strength was measured as follows according to the "Touch and Close Fastener 7.4.2 Peeling Strength" of JIS L3416:2000.

A test piece of 25 mm width remaining in the bonded state was taken from the treated samples, and the "bonding strength" of a 50-mm bonded part was measured with an autograph (manufactured by Shimadzu Corporation). The maximum value was taken and the average of the results of six measurements in total was calculated.

A "bonding strength" of 0.10 N or more was determined as "bonding".

When the bonding state was not maintainable until the test piece was attached to a grip, the "bonding strength" was determined as "0.00".

(7) Top Layer Delamination ("None", "Fluffing", "Delamination")

The state of the top layer delamination was determined by peeling the bonded samples (two samples for each set) by hands and visually checking whether fluffing of either sample surface and top layer delamination occur.

When the bonding strength was less than 0.10 N and top layer delamination of a thickness of less than 0.1 mm was seen on a surface of either AGM separator, the case was determined as "fluffing".

When the bonding strength is less than 0.10 N, the amount of the surface of one AGM separator that is peeled off is less than 0.1 mm and the AGM separator is in a topically peeled state, and thus the influence on the battery performance is small.

When top layer delamination of a thickness of 0.1 mm or more was seen on a surface of either AGM separator, the case was determined as "delamination".

When neither "fluffing" nor "delamination" was found, the case was determined as "none".

Such evaluation results of Examples 1 to 7, Reference Examples 1 to 2, and Comparative Examples 1 to 9 were collectively shown in Tables 1 to 2.

TABLE 1

| 1 | Item | | | | Fineness dtex | Unit | Example 1 | Example 2 | Example 3 | Example 4 | Example 5 | Example 6 | Example 7 |
|---|---|---|---|---|---|---|---|---|---|---|---|---|---|
| 2 | Non-fiber | C glass short fiber | | Fiber diameter | 0.8 μm | wt % | 75 | 87 | 75 | 70 | 60 | 70 | 50 |
| 3 | adhesive | Kraray | PET | EP133-5 | 1.45 | | | | | | | 10 | 30 |
| 4 | Adhesive | UNITIKA | PET/PE | 6080 | 1.5 | | | 13 | 25 | 30 | 40 | 20 | 20 |
| 5 | fiber | Daiwabo | PP | PZ08-5 | 0.6 | | | | | | | | |
| 6 | | UNITIKA | PET/PET | Casven 8080 | 1.1 | | 25 | | | | | | |
| 7 | | UNITIKA | Co-PET | 4000 | 2.2 | | | | | | | | |
| 8 | | UNITIKA | PET/coPET | 4080 | 1.22 | | | | | | | | |
| 9 | Raw material | | Concentration | | | wt % | 0.25 | 0.25 | 0.25 | 0.25 | 0.25 | 0.25 | 0.25 |
| 10 | disaggregation | | pH | | | — | 3 | 3 | 3 | 3 | 3 | 3 | 3 |
| 11 | | | Time | | | sec | 60 | 60 | 60 | 60 | 60 | 60 | 60 |
| 12 | Papermaking condition | | pH | | | — | 3 | 3 | 3 | 3 | 3 | 3 | 3 |
| 13 | | | Pressing condition (reciprocation) | | | Number of times | 1 | 1 | 1 | 1 | 1 | 1 | 1 |
| 14 | Drying conditions | | Temperature | | | ° C. | 180 | 180 | 180 | 180 | 180 | 180 | 180 |
| 15 | | | Time | | | min | 30 | 30 | 30 | 30 | 30 | 30 | 30 |
| 16 | Weight | | | | | g/m2 | 270 | 266 | 259 | 262 | 260 | 238 | 240 |
| 17 | Thickness 20 kpa | | | | | mm | 1.65 | 1.62 | 1.61 | 1.59 | 1.63 | 1.57 | 1.60 |

TABLE 1-continued

| 1 | Item | | Fineness dtex | Unit | Example 1 | Example 2 | Example 3 | Example 4 | Example 5 | Example 6 | Example 7 |
|---|---|---|---|---|---|---|---|---|---|---|---|
| 18 | Apparent density | | | g/cm3 | 0.16 | 0.16 | 0.16 | 0.16 | 0.16 | 0.15 | 0.15 |
| 19 | Tensile strength | | | N/10 mm2 | 12.4 | 5.7 | 9.6 | 11.8 | 14.1 | 8.2 | 7.8 |
| 20 | Maximum pore size | | | μm | 19 | 18 | 20 | 22 | 29 | 25 | 27 |
| 21 | Top layer dilamination | 70° C. × 75% × 48 hr | | Visual observation | none | none | none | none | none | none | none |
| 22 | Bonding strength | 5 kPa | | N | 0.00 | 0.00 | 0.00 | 0.00 | 0.00 | 0.00 | 0.00 |
| 23 | Top layer dilamination | 70° C. × 75% × 48 hr | | Visual observation | none | none | none | none | fluffing | none | none |
| 24 | Bonding strength | 10 kpa | | N | 0.00 | 0.00 | 0.00 | 0.00 | 0.03 | 0.00 | 0.00 |

| 1 | Item | | | | Fineness dtex | Unit | Reference Example 1 | Reference Example 2 | Comparative Example 1 | Comparative Example 2 | Comparative Example 3 | Comparative Example 4 |
|---|---|---|---|---|---|---|---|---|---|---|---|---|
| 2 | Non-fiber adhesive | C glass short fiber | | Fiber diameter 0.8 μm | | wt % | 100 | 75 | 95 | 90 | 75 | 95 |
| 3 | | Kuraray | PET | EP133-5 | 1.45 | | | 25 | | | | |
| 4 | Adhesive fiber | UNITIKA | PET/PE | 6080 | 1.5 | | | | 5 | 10 | | |
| 5 | | Daiwabo | PP | PZ08-5 | 0.8 | | | | | | 25 | |
| 6 | | UNITIKA | PET/PET | Casven 8080 | 1.1 | | | | | | | |
| 7 | | UNITIKA | Co-PET | 4000 | 2.2 | | | | | | | |
| 8 | | UNITIKA | PET/coPET | 4080 | 1.22 | | | | | | | 5 |
| 9 | Raw material disaggregation | Concentration | | | | wt % | 0.25 | 0.26 | 0.25 | 0.25 | 0.25 | 0.25 |
| 10 | | pH | | | | — | 3 | 3 | 3 | 3 | 3 | 3 |
| 11 | | Time | | | | sec | 60 | 60 | 60 | 60 | 60 | 60 |
| 12 | Papermaking condition | pH | | | | — | 3 | 3 | 3 | 3 | 3 | 3 |
| 13 | | Pressing condition (reciprocation) | | | | Number of times | 1 | 1 | 1 | 1 | 1 | 1 |
| 14 | Drying conditions | Temperature | | | | ° C. | 180 | 180 | 180 | 180 | 180 | 180 |
| 15 | | Time | | | | min | 30 | 30 | 30 | 30 | 30 | 30 |
| 16 | Weight | | | | | g/m2 | 246 | 267 | 251 | 254 | 248 | 267 |
| 17 | Thickness 20 kpa | | | | | mm | 1.60 | 1.63 | 1.62 | 1.61 | 1.58 | 1.63 |
| 18 | Apparent density | | | | | g/cm3 | 0.15 | 0.16 | 0.15 | 0.16 | 0.16 | 0.16 |
| 19 | Tensile strength | | | | | N/10 mm2 | 2.1 | 1.5 | 3.6 | 4.8 | 2.6 | 6.1 |
| 20 | Maximum pore size | | | | | μm | 16 | 18 | 15 | 16 | 20 | 17 |
| 21 | Top layer dilamination | 70° C. × 75% × 48 hr | | | | Visual observation | none | none | none | none | none | delamination |
| 22 | Bonding strength | 5 kPa | | | | N | 0.00 | 0.00 | 0.00 | 0.00 | 0.00 | 0.10 |
| 23 | Top layer dilamination | 70° C. × 75% × 48 hr | | | | Visual observation | none | fluffing | none | none | fluffing | delamination |
| 24 | Bonding strength | 10 kpa | | | | N | 0.00 | 0.05 | 0.00 | 0.00 | 0.02 | 0.11 |

| 1 | Item | | | | Fineness dtex | Unit | Comparative Example 5 | Comparative Example 6 | Comparative Example 7 | Comparative Example 8 | Comparative Example 9 |
|---|---|---|---|---|---|---|---|---|---|---|---|
| 2 | Non-fiber adhesive | C glass short fiber | | Fiber diameter 0.8 μm | | wt % | 90 | 75 | 70 | 60 | 75 |
| 3 | | Kuraray | PET | EP133-5 | 1.45 | | | | | | |
| 4 | Adhesive fiber | UNITIKA | PET/PE | 6080 | 1.5 | | | | | | |
| 5 | | Daiwabo | PP | PZ08-5 | 0.8 | | | | | | |
| 6 | | UNITIKA | PET/PET | Casven 8080 | 1.1 | | | | | | |
| 7 | | UNITIKA | Co-PET | 4000 | 2.2 | | | | | | 25 |
| 8 | | UNITIKA | PET/coPET | 4080 | 1.22 | | 10 | 25 | 30 | 40 | |
| 9 | Raw material disaggregation | Concentration | | | | wt % | 0.25 | 0.25 | 0.25 | 0.25 | 0.25 |
| 10 | | pH | | | | — | 3 | 3 | 3 | 3 | 3 |
| 11 | | Time | | | | sec | 60 | 60 | 60 | 60 | 60 |
| 12 | Papermaking condition | pH | | | | — | 3 | 3 | 3 | 3 | 3 |
| 13 | | Pressing condition (reciprocation) | | | | Number of times | 1 | 1 | 1 | 1 | 1 |
| 14 | Drying conditions | Temperature | | | | ° C. | 180 | 180 | 180 | 180 | 180 |
| 15 | | Time | | | | min | 30 | 30 | 30 | 30 | 30 |
| 16 | Weight | | | | | g/m2 | 279 | 270 | 293 | 281 | 284 |
| 17 | Thickness 20 kpa | | | | | mm | 1.62 | 1.60 | 1.64 | 1.62 | 1.58 |
| 18 | Apparent density | | | | | g/cm3 | 0.17 | 0.17 | 0.18 | 0.17 | 0.18 |

-continued

| | | | | | | | | |
|---|---|---|---|---|---|---|---|---|
| 19 | Tensile strength | | N/10 mm2 | 7.7 | 12.8 | 15.8 | 20.8 | 10.4 |
| 20 | Maximum pore size | | µm | 16 | 19 | 19 | 26 | 18 |
| 21 | Top layer dilamination | 70° C. × 75% × 48 hr | Visual obser-vation | delam-ination | delam-ination | delam-ination | delam-ination | delam-ination |
| 22 | Bonding strength | 5 kPa | N | 0.13 | 0.24 | 0.37 | 0.54 | 0.16 |
| 23 | Top layer dilamination | 70° C. × 75% × 48 hr | Visual obser-vation | delam-ination | delam-ination | delam-ination | delam-ination | delam-ination |
| 24 | Bonding strength | 10 kpa | N | 0.21 | 0.61 | 0.73 | 0.98 | 0.32 |

As can be seen in the test results of Examples 1 to 7, Reference Examples 1 to 2, and Comparative Examples 1 to 9 shown in Table 1 to 2, by checking the state after leaving samples for 48 hours in a thermostatic and humidifying chamber under a pressure of 5 kPa or 10 kPa and under conditions of a temperature of 70° C. and a humidity of 75% as bonding conditions between separators (AGM separator) for valve-regulated lead acid batteries for the purpose of inhibiting delamination due to bonding between separators (AGM separators) for valve-regulated lead acid batteries, the type of the heat-fusible organic fiber that did not undergo "delamination" in the top layer in peeling even under the above bonding conditions and that gave a bonding strength of less than 0.10 N was able to be specified.

In the visual observation of the state of top layer delamination, the case where delamination of the surface layer of a thickness of 0.1 mm or more occurred was determined as "delamination", and the case where very slight peeling of a thickness of less than 0.1 mm occurred or the case where a piliform fiber rose was determined as "fluffing".

A recent separator (AGM separator) for valve-regulated lead acid batteries used in ISS has a small thickness of less than 1.8 mm, and even when one surface of an AGM separator is peeled off, a problem of quality occurs with delamination of a thickness of 0.1 mm or more in that a thickness specified for an AGM separator cannot be maintained. Then, a production loss is caused by reattachment of a roll in a battery assembly step on a customer side.

On the other hand, since very slight peeling of a thickness of less than 0.1 mm or the state where a piliform fiber arises is a state where a surface of an AGM separator is topically peeled off, the influence thereof on the battery performance is considered to be small. In addition, even an AGM separator for valve-regulated lead acid batteries used for ISS is considered to be able to maintain the thickness specified for an AGM separator with topical peeling of less than about 0.1 mm.

Since the case of "delamination" showed a bonding strength of at least 0.10 N or more, it can be determined that a bonding strength of less than 0.10 N does not cause "delamination". In a bonding test of an AGM separator, the type of the heat-fusible organic fiber that did not undergo bonding of the front and back surfaces (that did not undergo "delamination" and that gave a bonding strength of less than 0.10 N) was able to be specified.

In addition, the top layer of a separator that showed a bonding strength of less than 0.10 N did not undergo "delamination". This is presumed that because the strength of the bonding is smaller than the strength of the AGM separator itself so that "delamination" does not occur.

From the test results of Examples 1 to 7, Reference Examples 1 to 2, and Comparative Examples 1 to 9, it was able to be found that the separator (AGM separator) for valve-regulated lead acid batteries of the present invention does not undergo top layer "delamination", which may be caused by bonding between the front and back surfaces of AGM separators, even under a pressure by winding and/or under temperature/humidity environment (conditions) in transportation and storage, and that the present invention can provide a separator (AGM separator) for valve-regulated lead acid batteries that does not cause a defective quality and a production loss.

The invention claimed is:

1. A separator for valve-regulated lead acid batteries, comprising a microglass fiber and a heat-fusible organic fiber, the separator having a thickness under a pressure of 20 kPa of more than 0.50 mm and less than 1.80 mm, wherein the heat-fusible organic fiber is an organic fiber having a core/sheath structure with a sheath of a crystalline heat-fusible polyolefin resin or a crystalline heat-fusible polyester resin, and wherein the separator is characterized such that after two of the separators are left for 48 hours under a pressure of 5 to 10 kPa in an environment of a temperature of 70° C. and a humidity of 75%, the bonding strength between the two separators is less than 0.10 N.

2. The separator for valve-regulated lead acid batteries according to claim 1, wherein the bonding strength between the two separators after being left for 48 hours under a pressure of 5 kPa in an environment of a temperature of 70° C. and a humidity of 75% is less than 0.10 N.

3. The separator for valve-regulated lead acid batteries according to claim 1, wherein the bonding strength between the two separators after being left for 48 hours under a pressure of 10 kPa in an environment of a temperature of 70° C. and a humidity of 75% is less than 0.10 N.

4. The separator for valve-regulated lead acid batteries according to claim 1, wherein the separator has a tensile strength of 5.0 N/10 $mm^2$ or more.

5. The separator for valve-regulated lead acid batteries according to claim 1, wherein the heat-fusible organic fiber has a fineness of 0.9 dtex or more and 1.6 dtex or less.

6. The separator for valve-regulated lead acid batteries according to claim 1, which is a wound body wound with a pressure of 5 kPa or more applied.

7. The separator for valve-regulated lead acid batteries according to claim 1, wherein the heat-fusible organic fiber is contained in an amount of more than 12% by weight.

8. The separator for valve-regulated lead acid batteries according to claim 1, wherein the microglass fiber has a number average fiber diameter of 2 µm or less.

9. The separator for valve-regulated lead acid batteries according to claim 1, wherein the microglass fiber and the heat-fusible organic fiber are contained in a total amount of 60% by weight or more.

10. A valve-regulated lead acid battery comprising the separator for valve-regulated lead acid batteries according to claim 1.

* * * * *